US00RE42686E

(19) United States
(12) Reissued Patent
Shimizu

(10) Patent Number: US RE42,686 E
(45) Date of Reissued Patent: Sep. 13, 2011

(54) REMOTE CONTROLLER

(75) Inventor: Minoru Shimizu, Tokyo (JP)

(73) Assignee: Sony Computer Entertainment Inc., Tokyo (JP)

() Term: 14 Years**

(21) Appl. No.: 29/308,800

(22) Filed: Dec. 8, 2006

Related U.S. Patent Documents

Reissue of:
(64) Patent No.: Des. 521,460
Issued: May 23, 2006
Appl. No.: 29/224,854
Filed: Mar. 9, 2005

(30) Foreign Application Priority Data

Sep. 17, 2004 (JP) ..... D2004-028359

(51) LOC (9) Cl. ..... 14-03
(52) U.S. Cl. ..... D13/168
(58) Field of Classification Search ..... D13/168; D10/104, 106; D14/218, 247; 340/825.22, 340/825.24, 825.25, 825.31, 825.36, 825.69, 340/825.71, 825.72; 341/22, 173, 176; 348/734; 455/100, 151.1–151.4, 352–355; 463/39; 700/17, 18, 19, 22, 83
See application file for complete search history.

(56) References Cited

U.S. PATENT DOCUMENTS

| | | | | | |
|---|---|---|---|---|---|
| D307,739 | S | * | 5/1990 | Grant | D13/168 |
| D325,582 | S | * | 4/1992 | Emmons et al. | D14/218 |
| D331,060 | S | * | 11/1992 | Emmons et al. | D14/218 |
| D371,793 | S | * | 7/1996 | Patton | D14/218 |
| D430,143 | S | * | 8/2000 | Renk | D14/218 |
| D431,240 | S | * | 9/2000 | Deguchi | D14/218 |
| D435,543 | S | * | 12/2000 | Nakamura | D14/218 |
| D458,249 | S | * | 6/2002 | Hayashi | D14/218 |
| D487,263 | S | * | 3/2004 | Wang et al. | D14/247 |
| D492,284 | S | * | 6/2004 | Suzuki | D14/218 |
| D493,449 | S | * | 7/2004 | Wang et al. | D14/247 |
| D521,460 | S | * | 5/2006 | Shimizu | D13/168 |

FOREIGN PATENT DOCUMENTS

| | | | |
|---|---|---|---|
| GB | 2105921 | S | 10/2001 |
| GB | 2105921 | A | 11/2001 |
| JP | 1054526 | A | 8/1999 |
| JP | 1054594 | A | 8/1999 |
| JP | D1054526 | S | 11/1999 |
| JP | D1054594 | S | 11/1999 |
| JP | 1083813 | A | 6/2000 |
| JP | D1083813 | S | 9/2000 |

* cited by examiner

*Primary Examiner* — Selina Sikder
(74) *Attorney, Agent, or Firm* — Rader, Fishman & Grauer PLLC

(57) CLAIM

The ornamental design for a remote controller, as shown.

DESCRIPTION

FIG. 1 is a front elevational view of a remote controller showing my new design;
FIG. 2 is a rear elevational view thereof;
FIG. 3 is a left side devotional view thereof;
FIG. 4 is a right side elevational view thereof;
FIG. 5 is a top plan view thereof;
FIG. 6 is a bottom plan view thereof; and,
FIG. 7 is a perspective view thereof.

1 Claim, 5 Drawing Sheets

Figure 1:
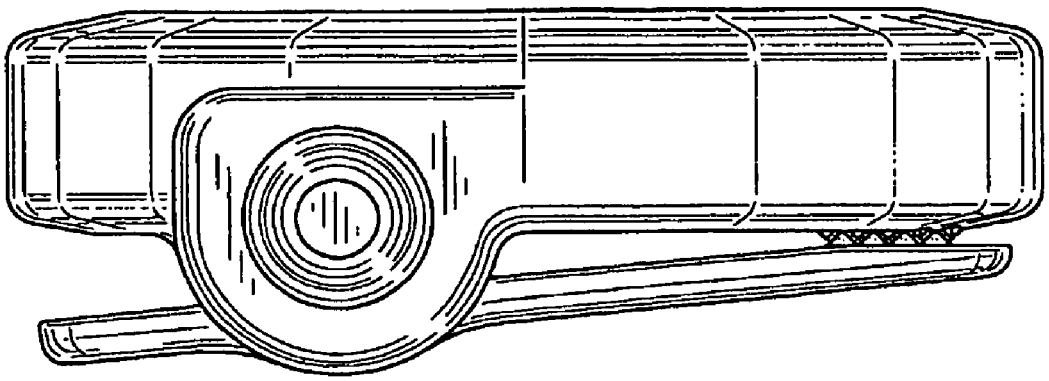
Figure 2:
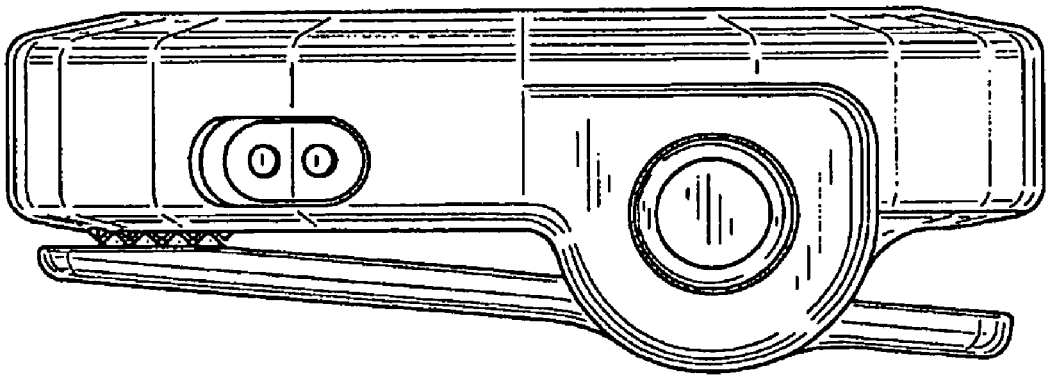
Figure 3:
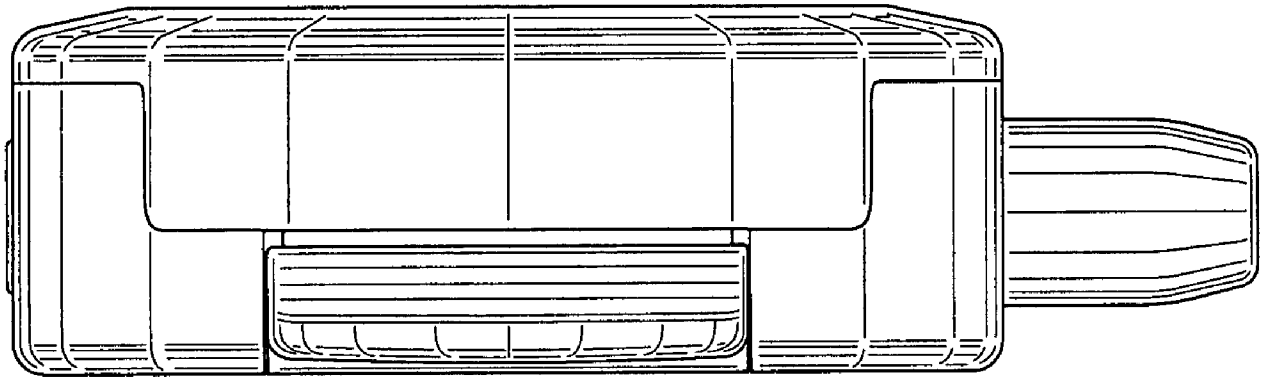
Figure 5:
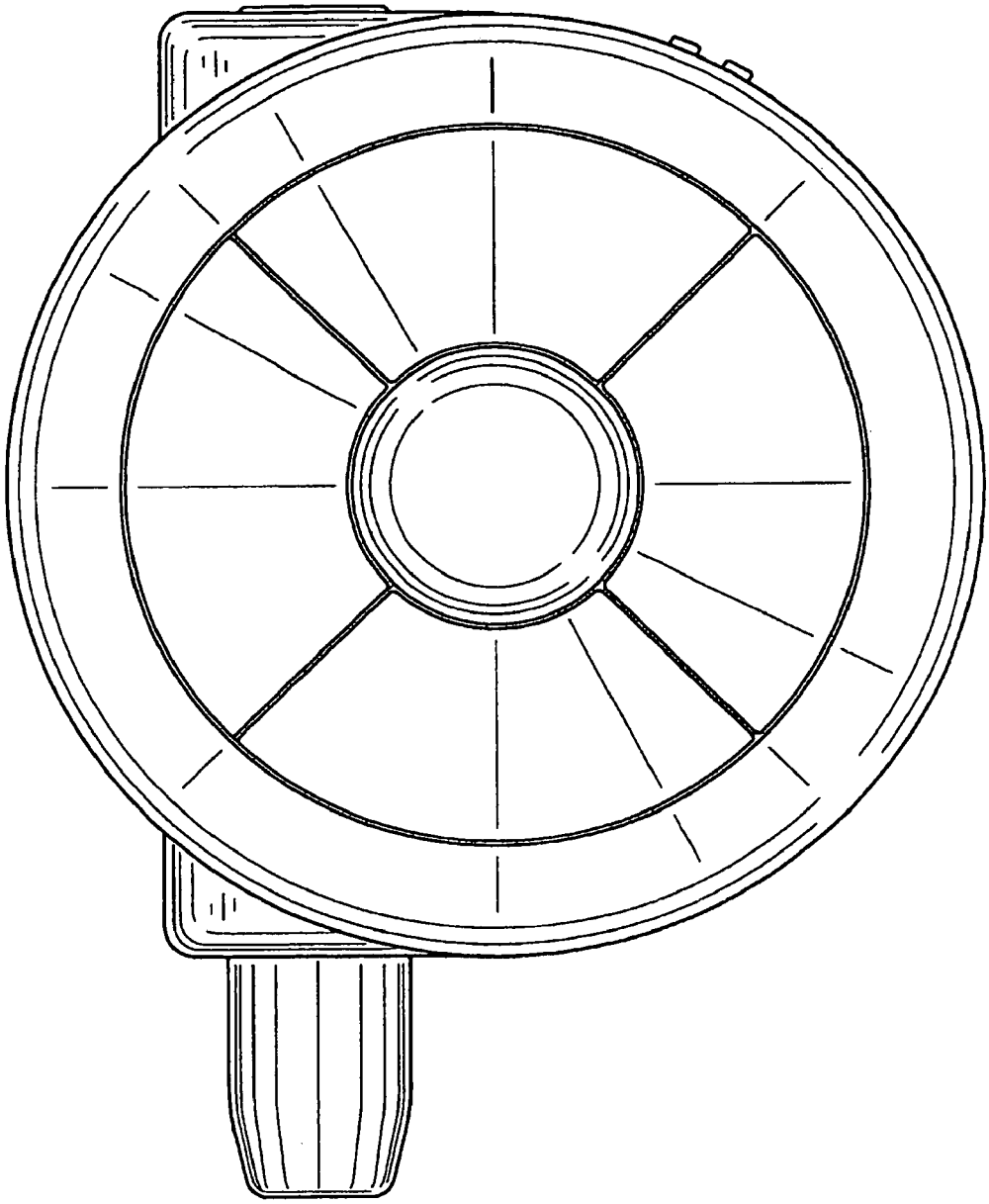
Figure 6:
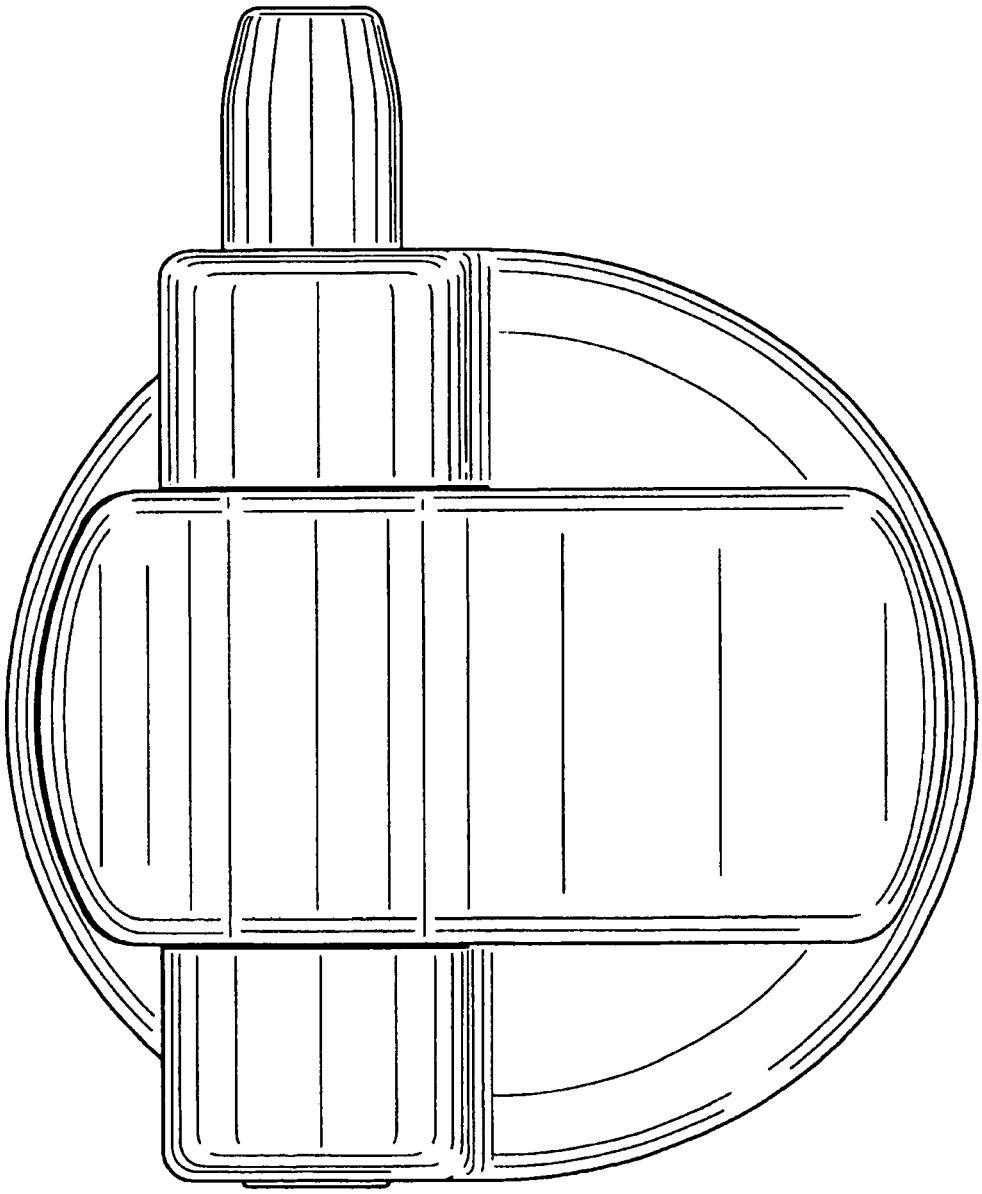
Figure 7:
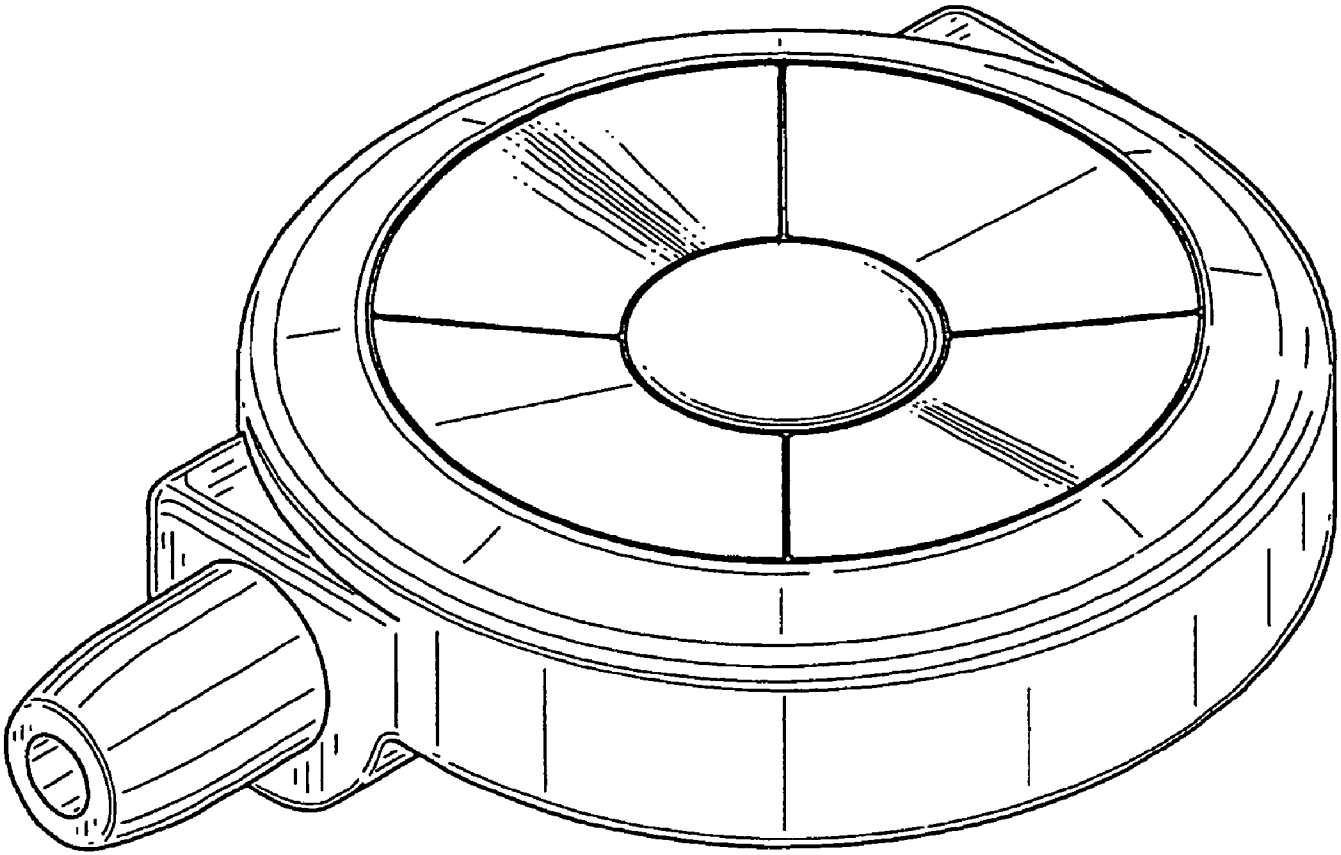

Matter enclosed in heavy brackets [ ] appears in the original patent, but forms no part of this reissue; matter printed in italics indicates the additions made by reissue.

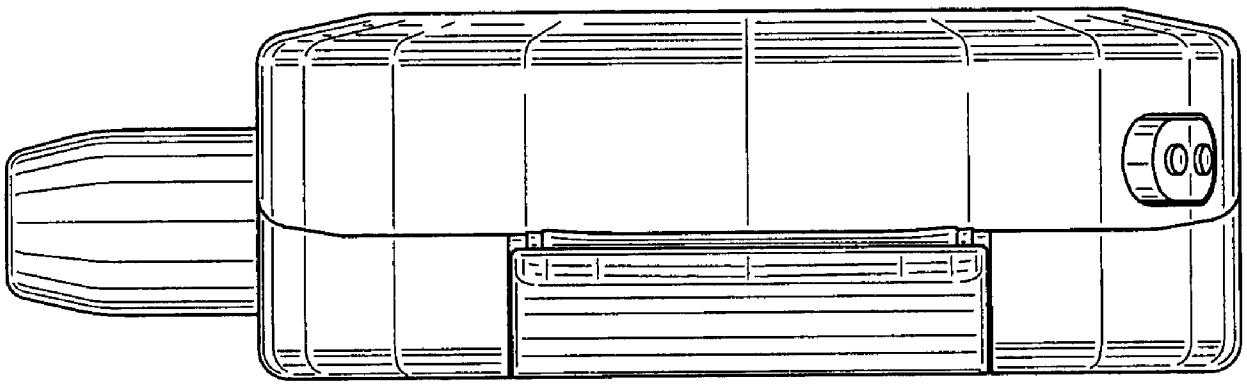
FIG.4
AMENDED